United States Patent [19]

Smith

[11] Patent Number: 4,632,364
[45] Date of Patent: Dec. 30, 1986

[54] BUNDLE CONDUCTOR STRINGING BLOCK GATE

[75] Inventor: Karl E. Smith, Bessemer, Ala.

[73] Assignee: Bethea Electrical Products, Inc., Birmingham, Ala.

[21] Appl. No.: 709,806

[22] Filed: Mar. 8, 1985

[51] Int. Cl.⁴ .......................... B66D 1/36; H02G 1/02
[52] U.S. Cl. .......................... 254/405; 254/134.3 PA
[58] Field of Search ............... 254/402, 403, 405, 406, 254/134.3 PA; 24/133, 136 L; 292/45, 54, 216; D8/336

[56] References Cited

U.S. PATENT DOCUMENTS

| | | | |
|---|---|---|---|
| 3,479,014 | 11/1969 | Reilly et al. | 254/405 |
| 3,837,623 | 9/1974 | Chadwick | 254/403 X |
| 3,868,089 | 2/1975 | Lindsey et al. | 254/403 X |
| 3,905,581 | 9/1975 | Chadwick | 254/405 X |
| 4,018,422 | 4/1977 | Bozeman | 254/403 X |
| 4,129,287 | 12/1978 | Lindsey et al. | 254/134.3 PA |
| 4,301,994 | 11/1981 | Lindsey | 254/405 X |

*Primary Examiner*—Stuart S. Levy
*Assistant Examiner*—Joseph J. Hail, III
*Attorney, Agent, or Firm*—Jennings, Carter, Thompson & Veal

[57] ABSTRACT

An improved line stringing block utilizes a double gate mechanism to transfer a lead line from the exterior of the block frame to the interior of the block frame. An outer gate is held open until the line is received within a passageway in the block frame. A non-load bearing inner gate is held closed to maintain alignment of said frame until the line is received in the passageway. A spring loaded trigger within the passageway releases the inner gate and closes the outer gate which becomes a load bearing gate.

7 Claims, 7 Drawing Figures

BUNDLE CONDUCTOR STRINGING BLOCK GATE

BACKGROUND OF THE INVENTION

This invention relates generally to apparatus for stringing a plurality of high voltage conductors simultaneously and more particularly to a transfer mechanism for transferring a lead line for such conductors from the exterior of a bundle block to the interior of the block. In greater particularity, the invention may be described as a dual gate arrangement for maintaining the alignment of an open-sided block and closing the block after receiving the line.

The prior art helicopter stringing blocks have employed a number of devices to facilitate the transfer of the lead line to the interior of the frame. These devices include open-sided block as well as closed-head bundle block transfer means. By way of example, U.S. Pat. No. 3,479,014 shows a helicopter stringing block of the open-sided variety as does U.S. Pat. No. 3,837,623 and 3,868,089. These mechanisms however do not provide bi-lateral support for the conductors when the bundle block is fully loaded. Further, some open-sided blocks exhibit torsional distortion about a vertical axis which results in a misalignment of the frame members. To achieve such support and alignment U.S. Pats. Nos. 3,905,581 and 4,018,422 use rotating disc type gates. While such devices are suitable for their intended purpose, they are complicated in structure, difficult to operate and somewhat lacking in reliability under certain adverse weather conditions such as icing.

SUMMARY OF THE INVENTION

It is an object of the present invention to provide a means for threading a helicopter bundle block which will maintain the proper torsional alignment of an open-sided bundle block.

Another object of the present invention is to provide a continuously aligned frame which provides bi-lateral support to the block sheaves when the conductors are loaded thereon.

Yet another object is to provide an open-sided block which minimizes fouling of the lead line.

These and other objects of the invention are advantageously accomplished through the use of a synchronous double gate mechanism. The open-sided block is essentially a frame including first and second side members which support a rotatably mounted conductor carrying sheave. The first side member is rigidly connected to a stringing yoke to support the frame and sheaves prior to loading the conductors. A lead line is threaded through a passageway formed by the yoke and the second side member. An alignment gate, mounted on the interior of the frame, connects the yoke to the second side member across this passageway to maintain torsional alignment of the yoke and frame when unloaded. The alignment gate is held across the pasageway by a spring-loaded cam surface until a lead line enters the passageway. An outer gate, which becomes a load bearing gate when closed, is held open and moves concomitantly with the spring-loaded cam surface such that the outer gate moves into a locked, weight bearing position transverse the passageway after a lead line enters the passageway. The double gate mechanism thus advantageously maintains the torsional alignment of the frame and yoke and thereby insures that the outer weight bearing gate will be able to close. The weight bearing gate provides a simple open-sided block which can be supported from both sides of the sheave when placed under the load of the conductors. The inner or alignment gate also returns to a closed position after the lead line passes through the passageway, thereby preventing the lead line from re-entering the passageway and becoming fouled therein. Furthermore, the relative simplicity of the operation of the device and its open-sided arrangement make the double gate mechanism virtually impervious to adverse weather conditions, such as icing.

DESCRIPTION OF THE DRAWINGS

These and other features and advantages of my invention may be more fully comprehended by a perusal of the description of the preferred embodiment in conjunction with the appended drawings, which form a part of this application wherein.

DESCRIPTION OF A PREFERRED EMBODIMENT

Figure 1:
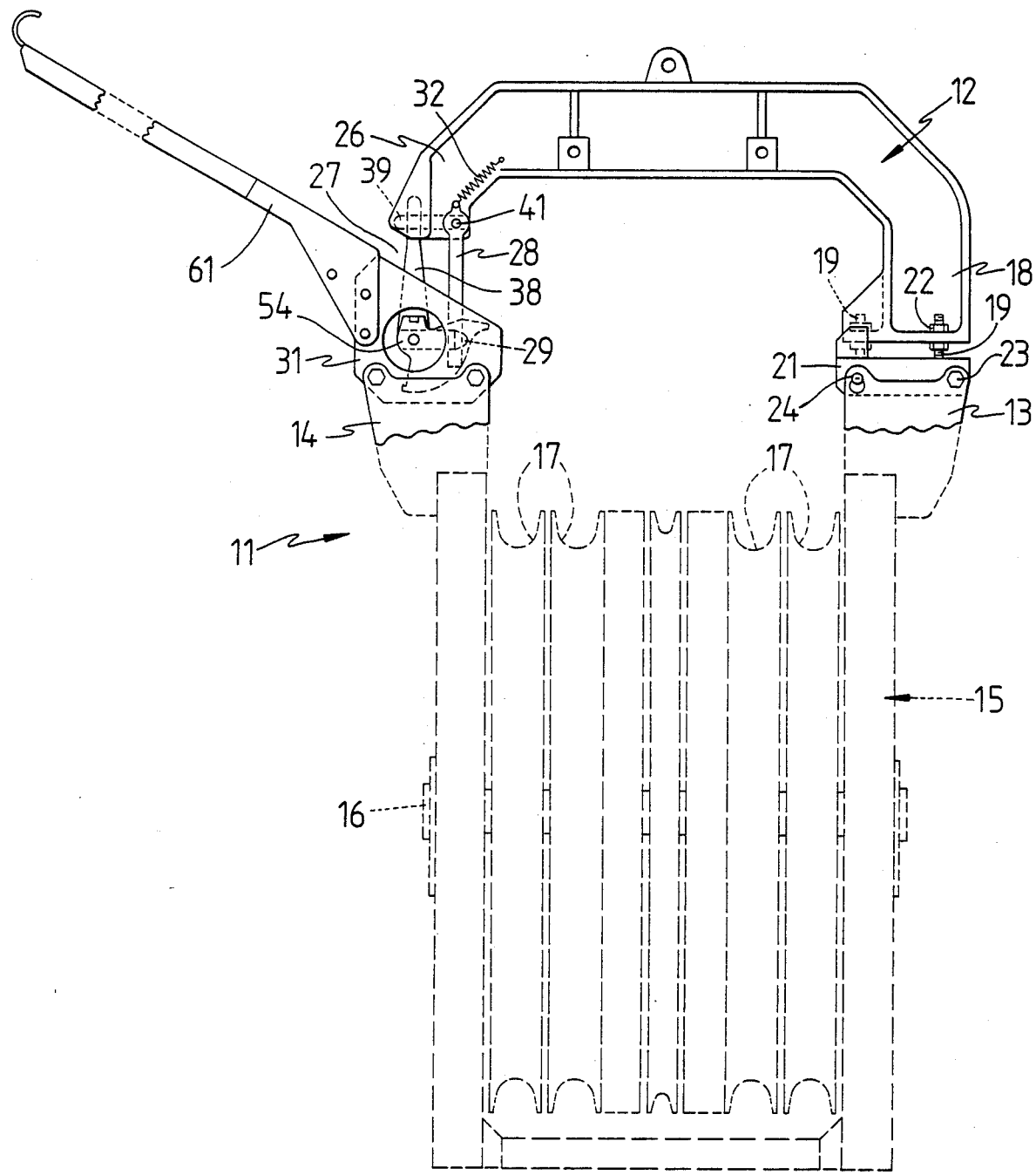
FIG. 1 is an elevational view showing a helicopter stringing block with both the load bearing and alignment gate closed.

Referring to FIG. 1 there is shown a helicopter bundle conductor stringing block 11 which has an upper yoke 12 adapted for connection to the lower end of power line insulators depending from transmission line towers. The yoke 12 has depending therefrom a frame 15 including a first side frame member 13 and a second side frame member 14, which support a shaft 16 upon which is mounted a set of sheaves 17 for carrying a number of conductors, not shown. The yoke 12 has a closed side 18 through which there extends vertical bolts 19. These bolts 19 extend upwardly through apertures in an adjustment block 21 and support the adjustment block 21 in spaced relation beneath the closed side 18 of yoke 12. The separation between the adjustment block 21 and the yoke 12 is adjusted by manipulation of the upper and lower bi-way hex nuts 22 used to secure the bolts 19 to closed side 18. The adjustment block 21 also carries a support bolt 23 and a ball detent pin 24 which serve to connect the adjustment block 21 to the first side frame member 13 such that the entire weight of the frame 15 is carried thereby.

Opposite the closed side 18 of the yoke 12 is an open side 26. This open side 26 and the second side frame member 14 define a passageway 27 through which a lead line or hauling line may be threaded into the interior of frame 15 above the sheaves 17. Pivotally mounted to the open side 26 is an alignment gate 28 which engages an alignment pin 29 integrated onto the upper inner portion of the second side frame member 14 by a gate support weldment 31. The alignment gate 28 is biased toward engagement with the alignment pin 29 by a tension spring 32 attached between gate 28 and the yoke 12. Thus, alignment gate 28 is normally biased to maintain its position transverse passageway 27. The alignment pin 29 is received within an aperture 33 in the gate 28. Disposed within the gate 28 adjacent the aperture 33 are an upper cam roller 34 and a lower cam roller 36 which engage the alignment pin 29 when the alignment gate 28 is closed. An outer cam roller 37 is mounted on a common axle with the lower cam roller 36 and is used to hold the gate 28 in the closed position as will be described hereinafter. It may be noted that in the closed position alignment gate 28 in conjunction with the yoke 12 and adjustment block 21 provide a continuous inner surface to facilitate the passage of a lead line subsequent to the threading of the line into the block 11. That is to say, the positioning of gate 28 in the closed position prevents the lead line from re-entering the passageway 27 and becoming fouled therein.

An outer gate 38 is pivotally mounted to the gate support weldment 31 for pivotal movement selectively to an open position and a close position. In the closed position the outer gate 38 engages a locking pin 39 and becomes a weight bearing member for supporting the weight of the conductors on the sheaves 17. The locking pin 39 is mounted in the open side 26 and held therein by a shaft 41 which also provides the pivotal mounting structure for alignment gate 28. The locking pin 39 has a hemispherical outer end 42 circumscribed by a groove 43. Outer gate 38 carries a latch bar support structure 44 which in turn carries a latch bar 46 resiliently biased toward an aperture 47 in outer gate 38. This aperture 47 receives locking pin 39 therein such that latch bar 46 engages the groove 43 and is resiliently held in locking engagement with the locking pin 39. A spring 49 provides the required resiliency by acting on a spring pin 51 and the latch bar support 44'. The latch bar 46 may be retracted from the groove by a pull ring 52.

Outer gate 38 is pivotally mounted on a shaft 53. Also pivotally mounted on this shaft 43 is a gate retainer 54 which moves about the shaft 53 concomitantly with outer gate 38. This gate retainer 54 is generally pie-shaped and has an arucate outer periphery 56. The gate retainer 54 carries along a portion of this periphery 56 a transversely extending cam surface 57 which extends perpendicular to the plane of the gate retainer 54. When the outer gate 38 is in its open position, this cam surface 57 engages the aforementioned outer cam roller 37 inwardly of the frame 15 such that the alignment gate 28 cannot pivot inwardly. A trigger 58 is formed on the gate retainer 54 so that it extends across the passageway 27 when the outer gate 38 is open. This trigger 58 is engaged when a lead line enters the passageway whereupon the gate retainer 54 and outer gate 38 move concomitantly angularly about the shaft 53. Cam roller 37 then disengages the cam surface 57 and the inner gate 28 is free to pivot and admit the lead line to the interior of the frame 15. The outer gate 38 is loaded by a spring 59, which is also affixed to the gate support weldment 31, so that the gate 38 is held open by the spring 59 until the action of the lead line on trigger 58 rotates the gate 38 past center whereupon the spring 59 urges the gate 38 into engagement with locking pin 39.

The alignment gate 28 serves to keep the block 11 in proper torsional alignment while the weight bearing outer gate is open. Vertical alignment of both gates 28 and 38 with their respective pins 29 and 39 may be adjusted within a small range by positioning adjustment block 21 with the hex nuts 22 connecting the bolts 19 to closed side 18 of yoke 12.

Figure 2:
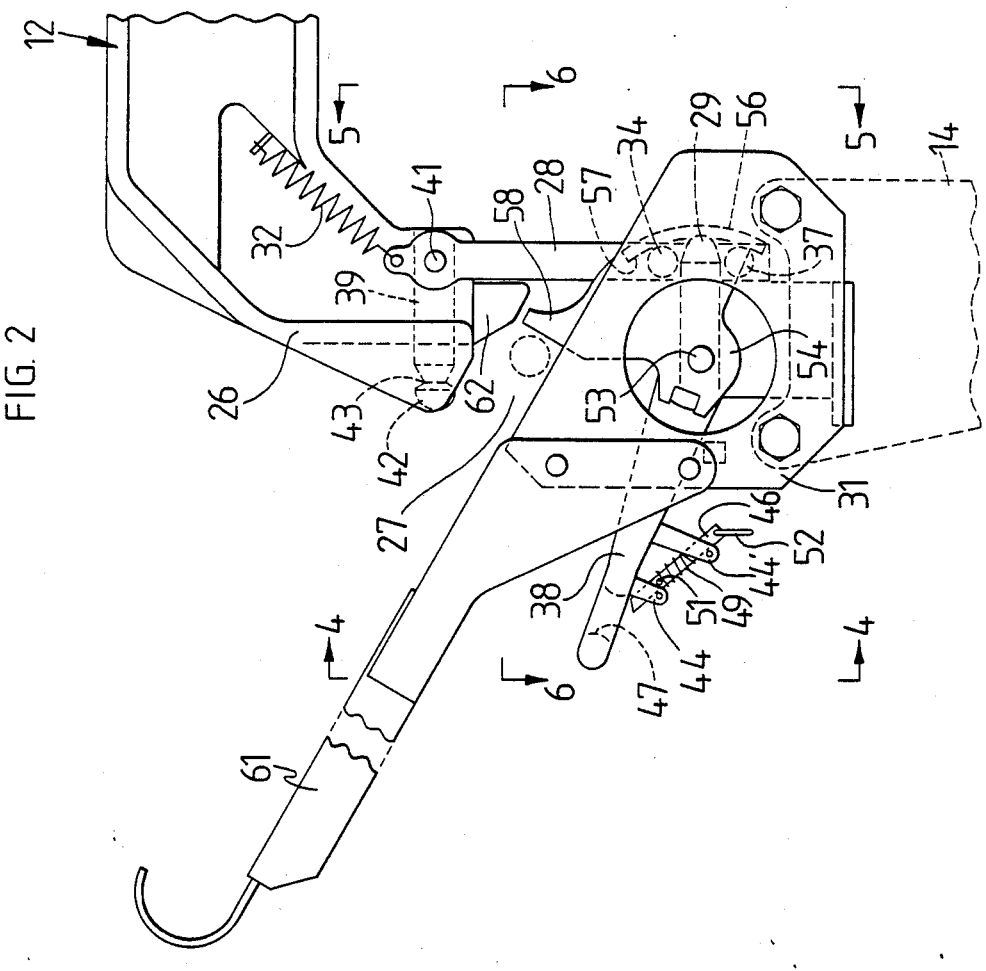
FIG. 2 is a front elevational view showing the dual gate mechanism in detail with the load-bearing gate open.
Figure 4:
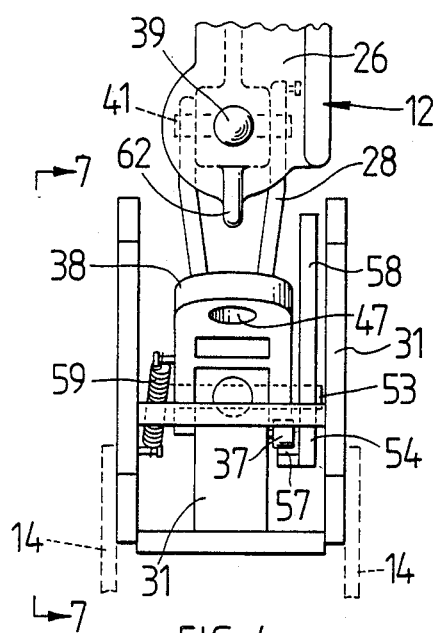
FIG. 4 is a side elevational view along line 4—4 of FIG. 2 showing the load bearing gate open.
Figure 5:
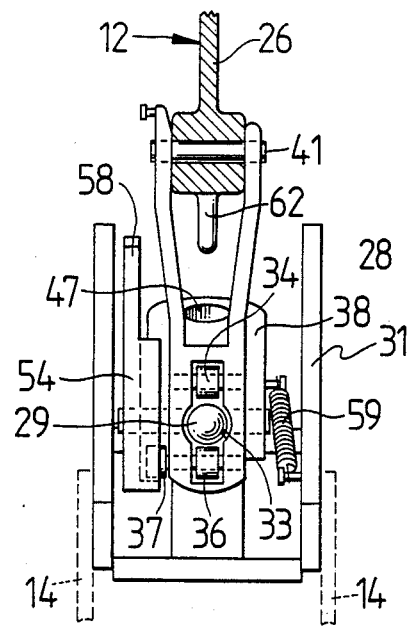
FIG. 5 is a side elevational view along line 5—5 of FIG. 2 showing the alignment gate closed.
Figure 6:
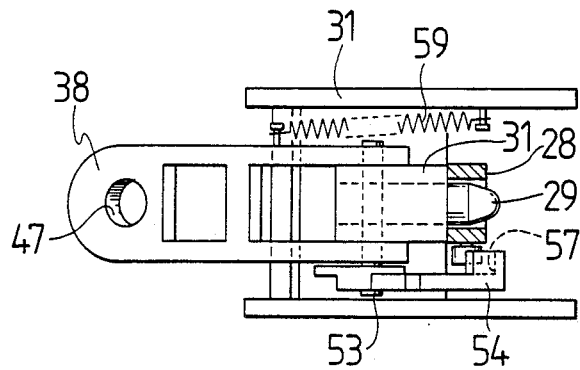
FIG. 6 is a plan view along line 6—6 of FIG. 2 showing the load bearing gate open.
Figure 7:
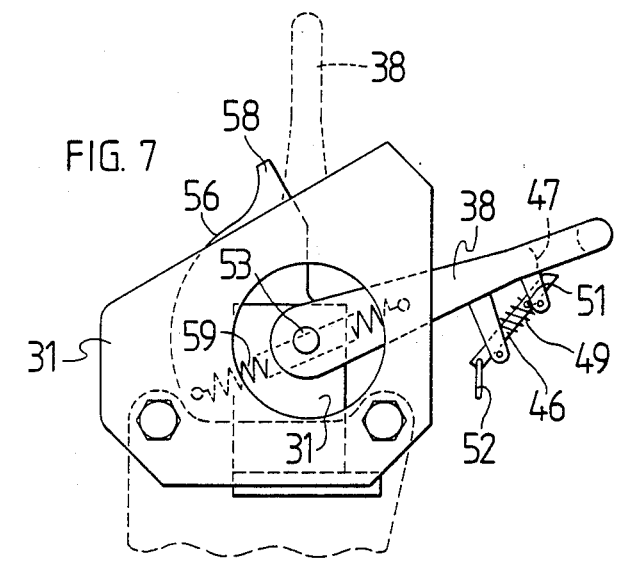
FIG. 7 is a rear elevational view showing the alignment of the trigger spring with the load-bearing gate open.

In operation, the block 11 is suspended from the conductor insulators mounted on a transmission tower. A helicopter-pulled lead line engages a helicopter boom 61 carried by the block 11 and aligned with passageway 27. At this point, the outer gate 38 is in its open position, as shown in FIG. 2, and presents no obstruction to the entry of the lead line into the passageway 27. Alignment gate 28 is closed and held in position by cam roller 37 and cam surface 57. In this position trigger 58 projects upwardly within the passageway 27. It should be noted that a guide 62 may be required to insure that the lead line engages the trigger 58 when it enters the passageway 27.

Figure 3:
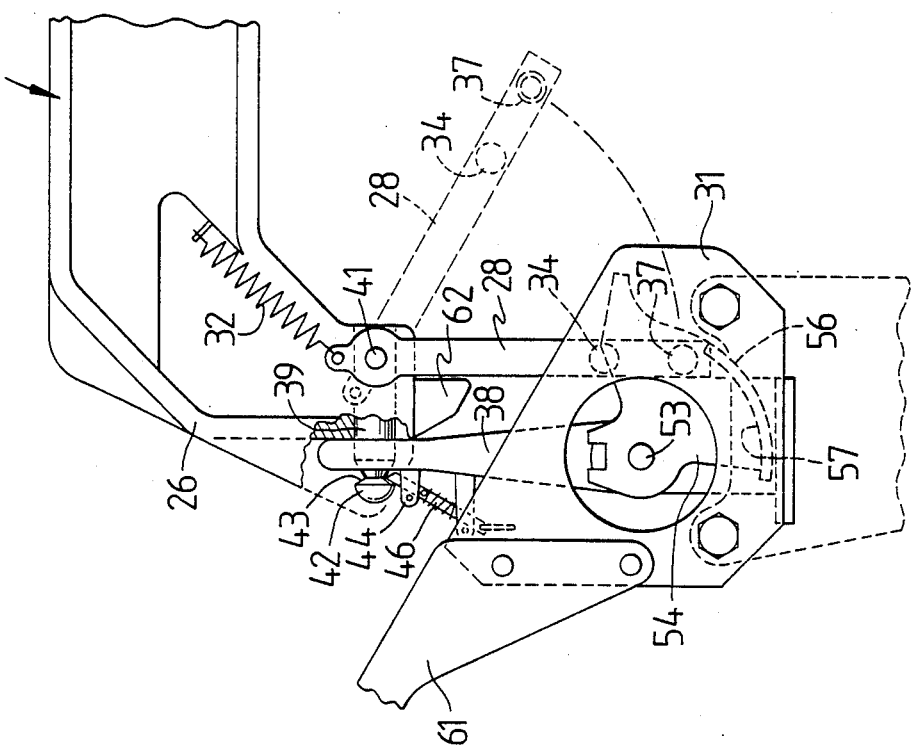
FIG. 3 is a front elevational view showing the dual gate mechanism in detail with the alignment gate closed in solid lines and open in dotted lines.

When the lead line engages the trigger 58 it has enough momentum to rotate the trigger 58 and thereby rotate outer gate 38 about shaft 53 a sufficient distance to enable spring 59 to close gate 38, as shown in FIG. 3, and free alignment gate 128 from the cam surface 57. As outer gate 38 moves toward the locking pin 39, the lead line opens the alignment gate 28 and enters the interior of the frame 15. The spring 32, which is a light-weight tension spring, then closes alignment gate 28 and the lead line is properly threaded within the block. It may be noted that once the lead line trips the trigger 58, it is therafter secured within the block 11, inasmuch as outer gate 38 closes and is locked shut by latch bar 46. The lead line may remain temporarily within passage 27; however, the movement of the helicopter will cause the lead line to swing against alignment gate 28, which is no longer restrained from its inward pivotal motion. The light-weight spring 32 offers little resistance to the lead line and the gate 28 admits the line. However, alignment gate 28 is not free to swing outwardly inasmuch as spring 32 urges it against the structure of gate support weldment 31 which supports pin 29, thus the lead line canot re-enter the passageway 27.

The lead line may then be drawn through the block 11 over the sheaves 17, as is common practice, to pull the conductor bundle through the block. The weight of the conductor bundle is supported at both open side 26 and closed side 18, thereby making this open-sided bundle block superior to prior art bundle blocks which could support the conductors from only one side of the yoke.

While I have shown my invention in but one form, it will be obvious to those skilled in the art that it is not so limited, but is susceptible of various changes and modifications without departing from the spirit thereof.

What I claim is:

1. In a bundle conductor stringing block including a yoke, a first vertical frame member rigidly attached to said yoke, a second vertical frame member spaced from said first vertical frame member, and a transversely extending shaft mounted between said vertical frame members carrying a plurality of rotatably mounted sheaves, wherein said yoke and said second vertical frame member define a passageway therebetween from the exterior of said block to the interior of said block, the improvement comprising:

(a) means for aligning said yoke and said second vertical frame member mounted therebetween transversely of said passageway including:

(i) an alignment gate pivotally mounted on said yoke internally of said block for movement into engagement with said second vertical frame member, and (ii) means for releasably securing said alignment gate in engagement with said second vertical frame member in response to the entry of a lead line into said passageway with said alignment gate having a retention cam roller mounted thereon, said cam roller being engaged by said means for releasably securing said alignment gate; and (b) gate means pivotally mounted to said second vertical frame member movable selectively to a first open position and to a second closed load bearing position responsive to the movement of a lead line within said passageway from the exterior of said block to the interior of said block.

2. The improvement defined in claim 1 wherein said means for releasably securing said alignment gate comprises:

(a) a gate retainer member rotatably mounted for movement selectively to a first position and to a second position, said gate retainer member having formed thereon a cam surface for engageing said retention cam roller and holding said alignment gate in engagement with said second vertical frame member at said first position and for disengaging said retention cam roller at said second position, said gate retainer means also having a trigger member extending within said passageway in said first position; and (b) means for biasing said gate retainer member in said first position prior to entry of a lead line into a passageway and for urging said gate retainer member toward said second position upon engagement of said trigger member by a lead line.

3. The improvement defined in claim 2 wherein said means for biasing said gate retainer member is a tension spring connected at one end to said second vertical frame member and connected at the other end thereof to said gate retainer member. versely of said passageway including:

(i) an alignment gate pivotally mounted on said yoke internally of said block for movement into engagement with said second vertical frame member, and (ii) means for releasably securing said alignment gate in engagement with said second vertical frame member in response to the entry of a lead line into said passageway with said alignment gate having a retention cam roller mounted thereon, said cam roller being engaged by said means for releasably securing said alignment gate; and (b) gate menas pivotally mounted to said second vertical frame member movable selectively to a first open position and to a second closed load bearing position responsive to the movement of a lead line within said passageway from the exterior of said block to the interior of said block.

4. In a bundle conductor stringing block including a yoke, a first vertical frame member rigidly attached to said yoke, a second vertical frame member spaced from said first vertical frame member, and a transversely extending shaft mounted between said vertical frame members carrying a plurality of rotatably mounted sheaves, wherein said yoke and said second vertical frame member define a passageway therebetween from the exterior of said block to the interior of said block, the improvement comprising:

(a) means for aligning said yoke and said second vertical frame member mounted therebetween transversely of said passageway including:

(i) an alignment gate pivotally mounted on said yoke internally of said block for movement into engagement with said second vertical frame member, and (ii) means for releasably securing said alignment gate in engagement with said second vertical frame member in response to the entry of a lead line into said passageway; and (b) gate means pivotally mounted for said second vertical frame member movable selectively to a first open position and to a second closed load bearing position responsive to the movement of a lead line within said passageway from the exterior of said block to the interior of said block wherein said gate means rotates with said means for releasably securing said alignment gate for concomitant motion therewith to said first open position and to said second closed load bearing position.

5. In a bundle conductor stringing block including a yoke, a first vertical frame member rigidly attached to said yoke, a second vertical frame member spaced from said first vertical frame member, and a transversely extending shaft mounted between said vertical frame members carrying a plurality of rotatably mounted sheaves, wherein said yoke and said second vertical frame member define a passageway therebetween from the exterior of said block to the interior of said block, the improvement comprising:

(a) means for aligning said yoke and said second vertical frame member mounted therebetween transversely of said passageway including:

(i) an alignment gate pivotally mounted on said yoke internally of said block for movement into engagement with said second vertical frame member, and (ii) means for releasably securing said alignment gate in engagement with said second vertical frame member in response to the entry of a lead line into said passageway;

(b) gate means pivotally mounted to said second vertical frame member movable selectively to a first open position and to a second closed load bearing position responsive to the movement of a lead line within said passageway from the exterior of said block to the interior of said block;

(c) an alignment pin mounted to said second vertical frame member and extending inwardly of said block for engagement with said alignment gate; and (d) an upper and lower alignment roller carried by said alignment gate and vertically spaced apart for receiving said alignment pin therebetween.

6. In a bundle conductor stringing block having a yoke supporting a frame including a first and second vertical member with said first vertical member rigidly attached to said yoke and said second vertical member spaced apart from said yoke and defining a passageway therein for threading a lead line into said block, the improvement comprising:

(a) an alignment gate connecting said yoke and said second vertical member on the interior of said block and resiliently biased transversely of said passageway;

(b) a load bearing gate connecting said yoke and said second vertical member on the exterior of said block and movable selectively to an open position and to a closed position transverse said passageway; and
(c) means for holding said alignment gate transversely of said passageway while said locking gate is in said open position including a rotatably mounted cam surface engaging said alignment gate and securing said gate transversely of said passageway, said cam surface being resiliently biased for rotation away from said alignment gate responsive to the entry of said lead line into said passageway.

7. The improvement defined in claim 6 wherein said rotatably mounted cam surface is connected to said locking gate for concomitant movement therewith.

* * * * *